United States Patent [19]
Endo et al.

[11] 4,056,764
[45] Nov. 1, 1977

[54] POWER SUPPLY SYSTEM HAVING TWO DIFFERENT TYPES OF BATTERIES AND CURRENT-LIMITING CIRCUIT FOR LOWER OUTPUT BATTERY

[75] Inventors: Takuya Endo; Toshio Hirota, both of Yokohama, Japan

[73] Assignee: Nissan Motor Company, Limited, Japan

[21] Appl. No.: 582,387

[22] Filed: May 30, 1975

[30] Foreign Application Priority Data

June 3, 1974 Japan .......................................... 49-61834

[51] Int. Cl.$^2$ ................................................ H02J 7/00
[52] U.S. Cl. ............................................ 320/3; 320/15; 320/39; 323/4; 318/139
[58] Field of Search ................ 320/2, 3, 4, 5–14, 320/21, 32, 39, 15; 323/4, 15; 318/139

[56] References Cited

U.S. PATENT DOCUMENTS

| | | | |
|---|---|---|---|
| 2,818,543 | 12/1957 | Dodge | 320/3 |
| 3,350,628 | 10/1967 | Gallaher et al. | 323/4 |
| 3,686,549 | 8/1972 | Winebrener | 318/139 |
| 3,769,572 | 10/1973 | Doubt | 323/4 |

*Primary Examiner*—Robert J. Hickey
*Attorney, Agent, or Firm*—Robert E. Burns; Emmanuel J. Lobato; Bruce L. Adams

[57] ABSTRACT

A system constituted at a relatively large capacity and low output first battery such as a fuel cell, a smaller capacity and higher output second battery, and a current-limiting circuit for restricting the maximum discharge current of the first battery to a predetermined value slightly above the open-circuit voltage of the second battery, which circuit consists of a measuring circuit for measuring the discharge current, a signal generating circuit for providing a reference signal representing the predetermined current, a comparator for the comparison between the reference signal and the measured current and a current flow control circuit operated by the output of the comparator.

4 Claims, 10 Drawing Figures

POWER SUPPLY SYSTEM HAVING TWO DIFFERENT TYPES OF BATTERIES AND CURRENT-LIMITING CIRCUIT FOR LOWER OUTPUT BATTERY

This invention relates to a power supply system which is useful as an energy source for operating a vehicle and made up of two different types of batteries, one of which has a larger capacity and the other a higher output, and more particularly to a current-limiting circuit for such a system.

When a group of batteries are employed as a power supply system for a load which needs a greatly variable load current continuously for a long period of time as typified by an electric automobile or a submarine, the power supply system is usually constituted of two different types of batteries.

The first of these two types of batteries is characterized by its large capacity. It can be discharged continuously for a quite long period of time, but its output is limited to a relatively low level, that is, this battery can be discharged only at moderate or low discharge currents. A battery of this type may be called an "energy battery" (hereinafter will be referred to as E-battery) and is exemplified by a fuel cell, an air cell battery and a nuclear battery. The other battery, on the contrary, is characterized by its great output or ability of delivering relatively high currents compared with the E-battery, but it cannot be discharged continuously for so long a period of time as the E-battery even at a moderate discharge current. This type of battery may be called a "power battery" (hereinafter referred to as P-battery) and is exemplified by a lead storage battery and an alkaline storage battery such as a nickel-cadmium battery. A capacitor can be regarded as a power supply analogous to the P-battery.

In a power supply system made up of these two types of batteries, the E-battery and P-battery are connected in parallel with each other, and exclusively the former furnishes an output current under relatively light load conditions.

The terminal voltage of the E-battery usually decreases as the discharge current is increased, while the P-battery exhibits little decrease in the terminal voltage from the open-circuit voltage even if it is discharged at considerably high discharge currents. When the load becomes heavier and the terminal voltage of the E-battery in this system drops to the same level as the open-circuit voltage of the P-battery, the P-battery begins to share in furnishing an increased output current. An arrangement of a conventional power supply system as well as its discharge characteristics will be briefly described with reference to a part of the Figures in the accompanying drawings.

Figure 2:
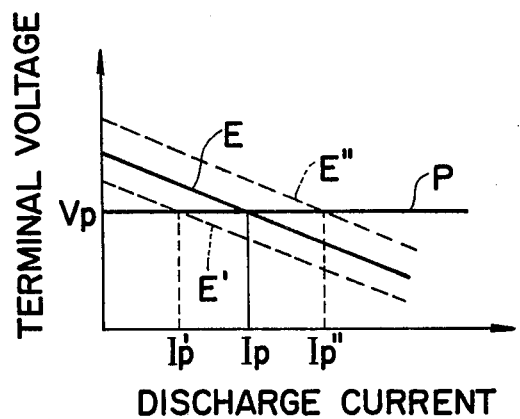
FIG. 2 is an explanatory graph showing discharge characteristics of the respective batteries in the system of FIG. 1.

In a conventional power supply system 10 for a fluctuating load 12, an E-battery 14 and a P-battery 16 are connected in parallel. The internal resistances of the respective batteries 14 and 16 are omitted for simplification and because of their unimportance in the description hereinafter. A switch 18 and a diode 20 are inserted in parallel with each other between the two batteries 14 and 16 for charging the P-battery by the use of a discharge current of the E-battery 14. When the load 12 remains at relatively low magnitudes and the switch 18 is kept closed, the discharge current of the E-battery serves as both a load current to the load 12 and a charging current for the P-battery 16 at the same time. The switch 18 is of such a type that it turns automatically off when the P-battery 16 is fully charged and prevents overcharge, and thereafter the discharge current of the E-battery 14 is applied exclusively to the load 12. If the discharge current of the E-battery 14 increases gradually due to controlled fluctuation of the load 12, the terminal voltage of the E-battery 14 lowers gradually and reaches the open-circuit voltages $V_p$ of the P-battery 16 at a discharge current of $I_p$ as shown in the graph of FIG. 2. When the magnitude of the load current for the load 12 is equal to $I_p$, the load current is delivered exclusively from the E-battery 14 and the P-battery 16 is neither charged nor discharged. As the capacity of the load 12 increases further the P-battery 16 begins discharging so that the load current which is now higher than $I_p$ is supplied from both the E-battery 14 and P-battery 16 in collaboration.

In the thus working power supply 10, the maximum discharge current of the E-battery 14 must be kept always constant at an optimum value. If the discharge current becomes too high, there arises a significant drop in the terminal voltage and hence efficiency of the E-battery 14, but an excessively low maximum discharge current results in an insufficient utilization of the E-battery 14 and incomplete charging of the P-battery 16.

In the graph of FIG. 2, the solid line curves E and P represent discharge characteristics of the E-battery 14 and P-battery 16, respectively. The maximum discharge current for the E-battery 14 in the power supply system of FIG. 1 corresponds to the point of intersection of the two characteristic lines E and P at $I_p$. In practice the discharge characteristics of the E-battery 14 and P-battery 16 vary respectively to considerable extents depending on environmental conditions, typically the ambient temperature, under which the system 10 is used. The characteristic line or discharge curve E may shift to either a lower curve E' or a higher curve E" and the critical current $I_p$ lowers to $I_p'$ or rises to $I_p''$.

It is a general object of the present invention to overcome the described disadvantage of the prior art power supply system made up of a combination of a long-lasting and low maximum output battery and a high maximum output and short-lasting battery.

More particularly it is an object of the invention to provide a power supply system fundamentally of the described type, which system further comprises a circuit for keeping the maximum discharge current of the former battery always at a most appropriately predetermined value regardless of the ambient conditions under which the system is operated.

It is another object of the invention to provide a power supply system which has an additional feature that the magnitude of a load current supplied therefrom exhibits a good response to controlled variations in the capacity of a load even when the terminal voltage of the system makes a sharp change at the discharge current of the aforementioned predetermined value.

The present invention is concerned with a power supply system which is constituted of a first battery and a second battery of different characteristics in parallel connection, which second battery has a lower open-circuit terminal voltage, a higher maximum output and a smaller capacity than the first battery. According to the invention, the power supply system further comprises a current-limiting circuit connected in series with the first battery, which current-limiting circuit is constructed such that the magnitude of the discharge current of the first battery is restricted to a maximum predetermined value. The predetermined value is below a critical current at which the terminal voltage of the first battery becomes equal to the open-circuit terminal voltage of the second battery.

The current-limiting circuit according to the invention is preferably comprised of a measuring circuit for measuring the magnitude of the discharge current, a signal generating circuit for producing a signal representing a current of the predetermined value, a comparison circuit for comparing the magnitude of the measured discharge current with the signal, and a current flow controlling circuit for restricting the flow of the discharge current therethrough to the maximum predetermined value in response to a control signal supplied from the comparison circuit.

Other features and advantages of the invention will become apparent from the following detailed description of preferred embodiments with reference to the accompanying drawings.

Figure 1:
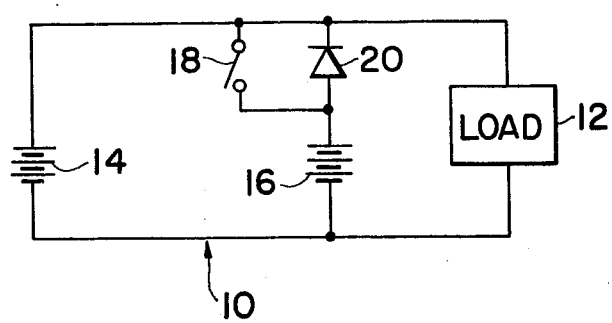
FIG. 1 is a circuit diagram of a conventional power supply system having an E-battery and a P-battery.
Figure 3:
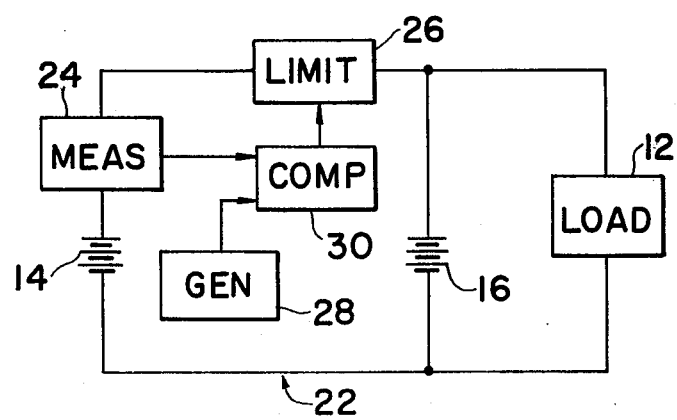
FIG. 3 is a fundamental block diagram of a power supply system also having an E-battery and a P-battery and including a current-limiting circuit for the E-battery according to the present invention.

FIG. 3 shows a fundamental block diagram of a power supply system 22 in accordance with the invention, which system 22 comprises the E-battery 14 and P-battery 16 in parallel connection similar to the conventional system 10 of FIG. 1 and is associated with the fluctuatable load 12. The internal resistances of the respective batteries 14 and 16 and the components for charging the P-battery 16 by the discharge current of the E-battery 14 are omitted for simplification. According to the invention, a current measuring circuit 24 and a current-limiting circuit 26 are inserted in series between the positive terminal of the E-battery 14 and the junction point with the P-battery 16, or output terminal of the system 22. In addition, the system 22 has a current-setting and signal-generating circuit 28 and a comparison circuit 30 in such an arrangement that the magnitude of a discharge current of the E-battery 14 is compared with a predetermined magnitude of current given by the current-setting circuit 28 in the comparison circuit 30 and that the output of the comparison circuit 30 controls the operation of the current-limiting circuit 26.

Figure 4:
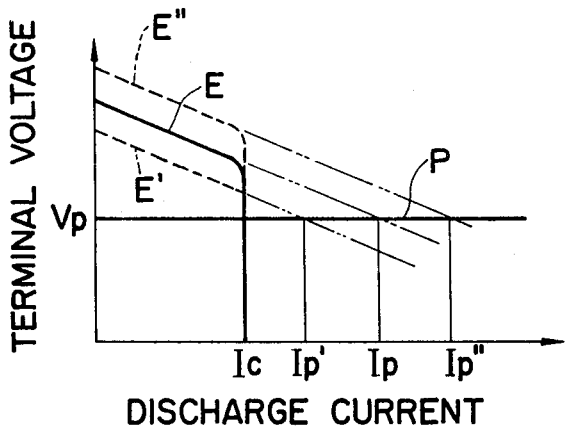
FIG. 4 is a graph showing qualitatively the discharge characteristics of the system of FIG. 3.

The current-limiting circuit 26 restricts the flow of current therethrough to a predetermined value $I_c$, so that the P-battery 16 begins discharging when the load 12 requires a current higher than $I_c$. The limiting current $I_c$ is usually determined below the critical current $I_p$ in FIG. 2. As seen in the graph of FIG. 4, the limiting current $I_c$ is determined a little below a current $I_p'$ which is practically the lowest value for the discharge current of the E-battery 14 at the terminal voltage $V_p$ equal to the open-circuit voltage of the P-battery 16 taking into account the variations in the discharge characteristics of the E-battery 14 depending on the ambient conditions. In the system 22 of FIG. 3, the maximum discharge current $I_c$ of the E-battery 14 can be maintained unvaried even if the terminal voltage of the E-battery 14 lowers along either the discharge curve E' or E" in FIG. 4 with the increase in the discharge current.

Although omitted from FIG. 4, a possible drop in the terminal voltage of the P-battery 16 is also taken into account at determination of the limiting current $I_c$. Consequently, the E-battery 14 is protected against discharging at an overcurrent and, on the other hand, can be utilized almost to the full extent. Such is quit profittable in industrial applications since the E-battery 14 is comparatively expensive. In addition, the P-battery 16 can be charged easily and under favorable conditions since the terminal voltage of the E-battery 14 is always kept apparently above that of the P-battery 16.

Figure 5:
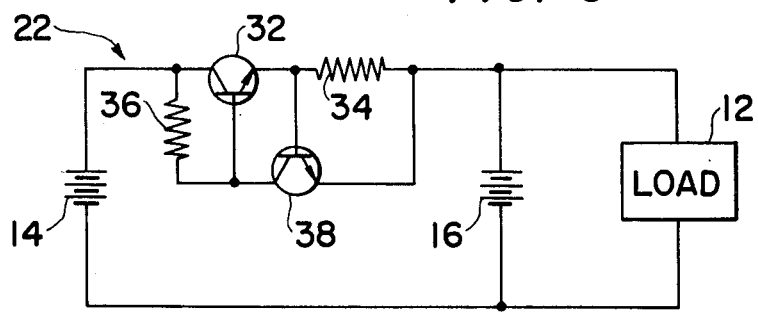
FIG. 5 is a circuit diagram of a current-limiting circuit which is a practical example of the system of FIG. 3.

In a preferred embodiment of the invention shown in the circuit diagram of FIG. 5, a first transistor 32 and a resistance 34 are inserted in series between the E-battery 14 and the P-battery 16 so that the discharge current of the E-battery 14 is applied to both the P-battery 16 and the load 12 through the first transistor 32, collector to emitter, and the resistance 34. Another resistance 36 is connected to provide a base-collector potential for the first transistor 32. The system 22 has a second transistor 38, which is connected to the first transistor 32 and the resistance 34 as follows. The collector and base of the second transistor 38 are connected to the base and emitter of the first transistor 32, respectively, and the emitter of the second transistor 38 to the resistance 34, so that the resistance 34 provides a base-emitter potential for the second transistor 38.

These transistors 32 and 34 perform the following functions. When a voltage drop $V_r$ across the first resistance 34 is less than a base-emitter barrier potential of the second transistor 38, the second transistor 38 remains in the off state while the first transistor 32 remains in the on state. When the current from the E-battery increases and the voltage drop $V_r$ reaches the base-emitter barrier potential of the second transistor 38, the transistor 38 begins to function and causes the first transistor 32 to function so as to exhibit an increased resistance between the collector and emitter. As a result, the current passing through the resistance 34 is decreased. Thus the resistance 34 functions as the measuring circuit 24 in FIG. 3, and the limiting current $I_c$ can be determined by the characteristic of the second transitor 38 and the value of the resistance 34. The first transistor 32 and the resistance 36 function as the current-limiting circuit 26 in FIG. 3.

Figure 6:
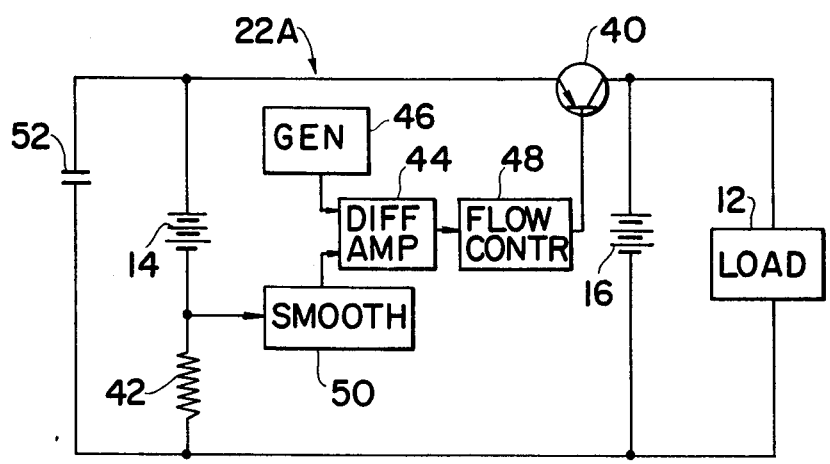
FIG. 6 is a block diagram of a power supply system also according to the invention but slightly modified from that of FIG. 3.

The current limitation according to the invention can be realized differently from the above embodiment. In another embodiment illustrated in FIG. 6, a power supply system 22A has a chopper transistor 40 and a resistance 42 through which the discharge current of the E-battery 14 is supplied to the load 12 and the P-battery 16. Additionally, this system 22A has a differential amplifier 44, a constant voltage generating circuit 46 which is connected to one of the input gates of the differential amplifier 44, and a control circuit 48 which is interposed between the output gate of the differential amplifier 44 and the base of the transistor 40. The other input gate of the differential amplifier 44 is connected to the resistance 42 via a smoothing circuit 50 such that a voltage $V_a$ developed proportionally to the discharge current of the E-battery 14 across the resistance 42 is applied to this input gate. The voltage generating circuit 46 is adjusted so as to generate a constant voltage $V_c$ which corresponds to the intended limiting current $I_c$. The differential amplifier 44 is constructed such that its output is a positive one if the voltage $V_a$ is below the reference voltage $V_c$, a negative one if $V_a$ exceeds $V_c$ and zero if $V_a$ equals to $V_c$. The control circuit 48 is constructed such that its output varies depending on the mode of the input signal supplied from the differential amplifier 44: it holds the transistor 40 in the on state and off state when the input signal is a positive one and a negative one, respectively, and causes the transistor 40 to switch on-and-off when the input signal is zero. All of the four circuits 44, 46, 48 and 50 which have the described functions, respectively, can be designed in well known fashions and will need no particular explanations.

As is apparent from the described construction, the transistor 40 remains in the on state and allows the discharge current of the E-battery 14 to pass from the emitter to the collector thereof when the current is lower than the predetermined value $I_c$. If the current increases up to $I_c$ the transistor 40 interrupts the current at regular intervals and prevents the amount of current flow therethrough from exceeding the value $I_c$. A capacitor 52 is preferably connected in series with the transistor 40 and in parallel with the E-battery 14 to avoid unfavorable effects of the interruptive or intermittent switching of the transistor 40 on the E-battery 14.

In a power supply system 22 or 22A according to the invention, its terminal voltage changes sharply at the limiting discharge current $I_c$ as seen in the graph of FIG. 4. This characteristic may sometimes have an unfavorable influence on the controllability of the current applied to the load 12 if the current is controlled by means of a chopper circuit. The load current does not increase immediately even though the current flow ratio in the chopper circuit is increased, but remains at the value $I_c$ until the terminal voltage of the E-battery 14 drops to the terminal voltage $V_p$ of the P-battery 16. It is a usual practice that the current flow ratio in the chopper circuit is varied in correlation to the magnitude of the action of a mechanical control element, for example, travel distance of an accelerator pedal for an electric automobile. Accordingly the load current does not change in response to the action of the control element when the load current fails to vary in response to the variation in the current flow ratio, so that the load 12 cannot be controlled smoothly and in small increments for a certain period of time in a certain operational range.

Figure 7:
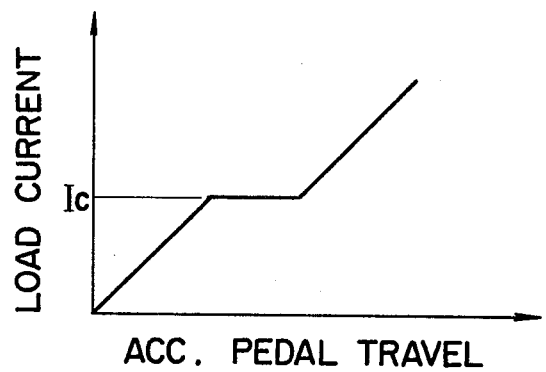
FIG. 7 is an explanatory graph showing a mode of variation in a load current when the system of FIG. 3 is used in a conventional way as a power source for a fluctuatable load.

In an electric automobile, for example, an increase in the travel of the accelerator pedal at the load current $I_c$ fails to increase the load current for a certain period of time as illustrated in an explanatory graph of FIG. 7, so that a quick acceleration of the automobile cannot be expected at the load current of $I_c$.

This unfavorable characteristic of a system 22 according to the invention can be eliminated by the provision of a chopper control circuit between the power supply system 22 and the chopper circuit for the control of the load current.

Figure 8:
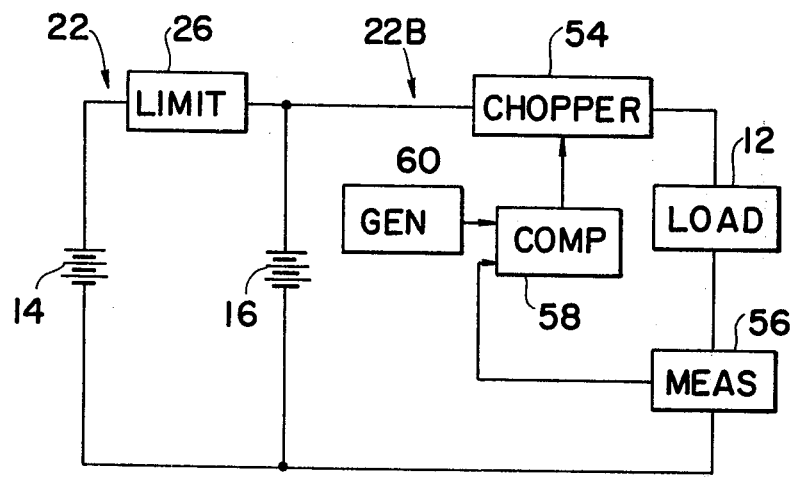
FIG. 8 is a block diagram showing a control circuit according to the invention for applying a controllably variable current to a load from the power supply system of FIG. 3.
Figure 9:
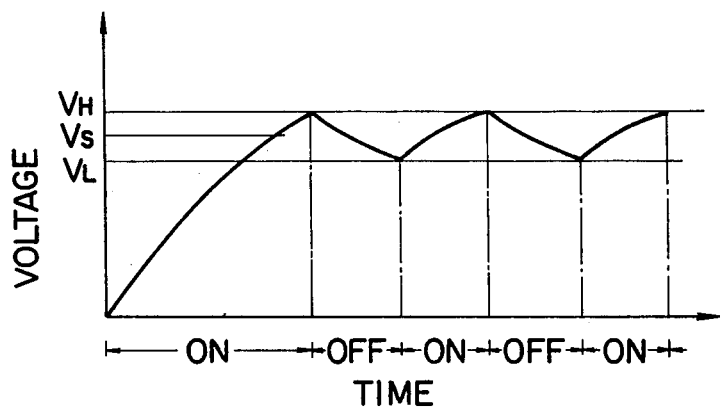
FIG. 9 is a time chart showing a periodical change in the output of the control circuit of FIG. 8.

In a system 22B of FIG. 8, the discharge current of the power supply system 22 of FIG. 4 is applied to the load 12 via a conventional chopper circuit 54, the current flow ratio of which is controlled by a separate controller (not shown). To control the current flow through the chopper circuit 54, this system 22B has a current measuring circuit 56 connected in series with the load 12, a comparison circuit 58 and a voltage generating circuit 60 which develops an output voltage $V_s$ proportional to the magnitude of the action of a controller (not shown) for controlling the current applied to the load 12. The comparison circuit 58 receives both the reference voltage $V_s$ from the voltage generating circuit 60 and another voltage $V_m$ which is developed in the measuring circuit 56 proportionally to the current actually applied to the load 12 and supplies a control signal to the chopper circuit 54 on the basis of comparison between the magnitudes of $V_s$ and $V_m$. The comparison circuit 58 is arranged such that the output signal thereof is of a mode to hold the chopper circuit 54 in the on state if $V_m$ is lower than $V_s$ and of another mode to hold the chopper 54 off if $V_m$ exceeds $V_s$. The comparison circuit 58 is arranged to exhibit a certain voltage hysteresis, so that the "on" signal is produced when the voltage $V_m$ is lower than a voltage $V_L$ which is a little lower than an ideally determined control voltage $V_s$ and the "off" signal is produced when $V_m$ reaches another voltage $V_H$ which is a little higher than the ideally determined voltage $V_s$. FIG. 8 shows schematically a mode of the variation in the voltage $V_m$ across the measuring circuit 56 with the function of the thus controlled chopper circuit 54. Thus the current applied to the load 12 can be varied with good response to the action of the controller under no influence of the output voltage of the power supply system 22.

Figure 10:
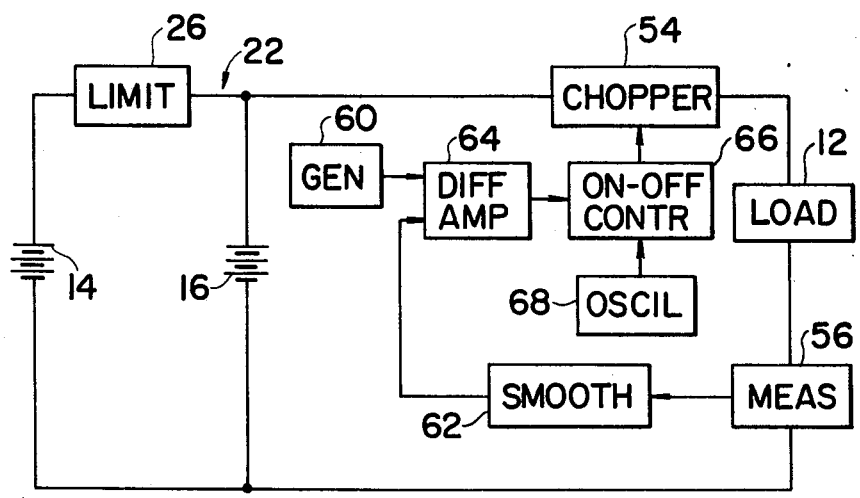
FIG. 10 is a block diagram of a control circuit fundamentally similar to that of FIG. 8, but being differently constructed as another preferred embodiment of the invention.

FIG. 10 shows another method of controlling the current flow through the chopper circuit 54 when the chopper circuit 54 is of the constant-frequency and variable current flow ratio type. The reference voltage $V_s$ from the voltage generation circuit 60 and the actual voltage $V_m$ from the measuring circuit 56 are supplied to a differential amplifier 64. A smoothing circuit for the voltage $V_m$ is indicated at 62.

A current flow ratio control circuit 66 is arranged between the differential amplifier 64 and the chopper circuit 54 and associated with an oscillation circuit 68 which produces an oscillatory signal for the determination of the interruption frequency of the chopper circuit 54. This control circuit 66 delivers a control signal to the chopper circuit 54 for the determination of the time durations of the "on" and "off" states in each operation cycle of the chopper circuit 54 based on the output of the differential amplifier 64 resulting from comparison between the magnitudes of the voltage $V_s$ and $V_m$. In other respects the system of FIG. 10 functions similarly to the system of FIG. 8, so that the current applied to the load 12 can be smoothly varied in exact accordance with the action of the controller for the load 12 even though the power supply system 22 exhibits a considerably sharp change in its terminal voltage at the limiting discharge current $I_c$.

What is claimed is:

1. In a power supply system of the type having a first battery and a second battery with a lower open-circuit voltage, higher maximum output current and lower total energy capacity than the first battery, and means connecting said first battery and said second battery to provide a power supply output current consisting of the total discharge currents from said first battery and said second battery; the improvement comprising: said means connecting said first battery and said second battery including discharge current distribution means for discharging substantially only said first battery to develop the output current when the magnitude of the total discharge current is less than a certain predetermined value and for discharging both said first battery and said second battery when the total discharge current is greater than the certain predetermined value with said second battery supplying a current equal to the difference between the magnitude of the discharge current of said first battery and the total output current to maintain the magnitude of the discharge current of said first battery less than the certain predetermined value, wherein the certain predetermined value is selected below a critical current value at which a terminal voltage of said first battery equals an open-circuit voltage of said second battery; said discharge current distribution means comprising current measuring means for measuring the magnitude of the discharge current from said first battery, signal generating means for generating a current signal of said certain predetermined value, comparison means for comparing the magnitude of the discharge current measured by said current measuring means with said current signal to develop a control signal representative of the difference between the measured current and the predetermined current value, and current limiting means responsive to the control signal developed by said comparison means for limiting the maximum magnitude of the discharge current from said first battery to the certain predetermined value.

2. In a power supply system according to claim 1, wherein said discharge current distribution means comprises a first resistance connected in series with said first battery, a second resistance, a first transistor having a collector connected to a terminal of said first battery through said second resistance, the collector-to-emitter transmission path of said first transistor providing a parallel circuit in parallel with said first resistance, and a second transistor, the collector-to-emitter transmission path thereof providing a portion of the circuit connecting said first resistance to said terminal, the base of said first transistor being connected to the emitter of said second transistor, the base of said second transistor being connected to the collector of said first transistor, so that the collector-to-emitter transmission path conductively of said second transistor is governed by the magnitude of said discharge current flowing through said first resistance.

3. In a power supply system according to claim 1, wherein said discharge current distribution means comprises a resistance in series with said first battery, a transistor, the emitter-to-collector transmission path thereof providing a portion of the circuit connecting said first battery with said second battery, a voltage generating means for developing a reference voltage representing a current of said predetermined value, a differential amplifier connected to receive said reference voltage and another voltage developed by the flow of said discharge current through said resistance, and a controlling means for receiving an output of said differential amplifier and for delivering to the base of said transistor a control signal varying such that said emitter-to-collector transmission path is conductive when said another voltage is below said reference voltage, non-conductive when said another voltage is above said reference voltage and intermittently conductive when said another voltage equals said reference voltage.

4. In a power supply system of the type having a first battery and a second battery with a lower open-circuit voltage, higher maximum output current and lower total energy capacity than the first battery, and means connecting said first battery and said second battery to provide a power supply output current consisting of the total discharge currents from said first battery and said second battery; the improvement comprising: said means connecting said first battery and said second battery including discharge current distribution means for discharging substantially only said first battery to develop the output current when the magnitude of the total discharge current is less than a certain predetermined value and for discharging both said first battery and said second battery when the total discharge current is greater than the certain predetermined value with said second battery supplying a current equal to the difference between the magnitude of the discharge current of said first battery and the total output current to maintain the magnitude of the discharge current of said first battery less than the certain predetermined value, wherein the certain predetermined current value is selected below a critical current value at which a terminal voltage of said first battery equals an open-circuit voltage of said second battery; said discharge current distribution means comprising current measuring means for measuring the magnitude of the discharge current from said first battery, signal generating means for generating a current signal of said certain predetermined value, comparison means for comparing the magnitude of the discharge current measured by said current measuring means with said current signal to develop a control signal representative of the difference between the measured current and the predetermined current value, and current limiting means responsive to the control signal developed by said comparison means for limiting the maximum magnitude of the discharge current from said first battery to the certain predetermined value; and further comprising reference signal generating means for developing a reference signal representative of the intended magnitude of the output current, another current measuring means for measuring the magnitude of the output current, a differential amplifier connected to receive the reference signal and the measured output current for developing a difference signal proportional to the difference between the reference current and the measured output current, a fixed-frequency variable current flow ratio type chopper circuit connected to flow the output current therethrough, an oscillator for developing an oscillatory output signal to determine the operating frequency of said chopper circuit, and a modulator circuit responsive to the difference signal developed by said differential amplifier and connected to apply the oscillator output signal to said chopper circuit under control of the difference signal to maintain the output current at a value determined by the reference signal, whereby the output current is substantially independent of changes in the terminal voltage of said first battery and when the discharge current of said first battery reaches said certain predetermined value.

* * * * *